Patented Oct. 24, 1922.

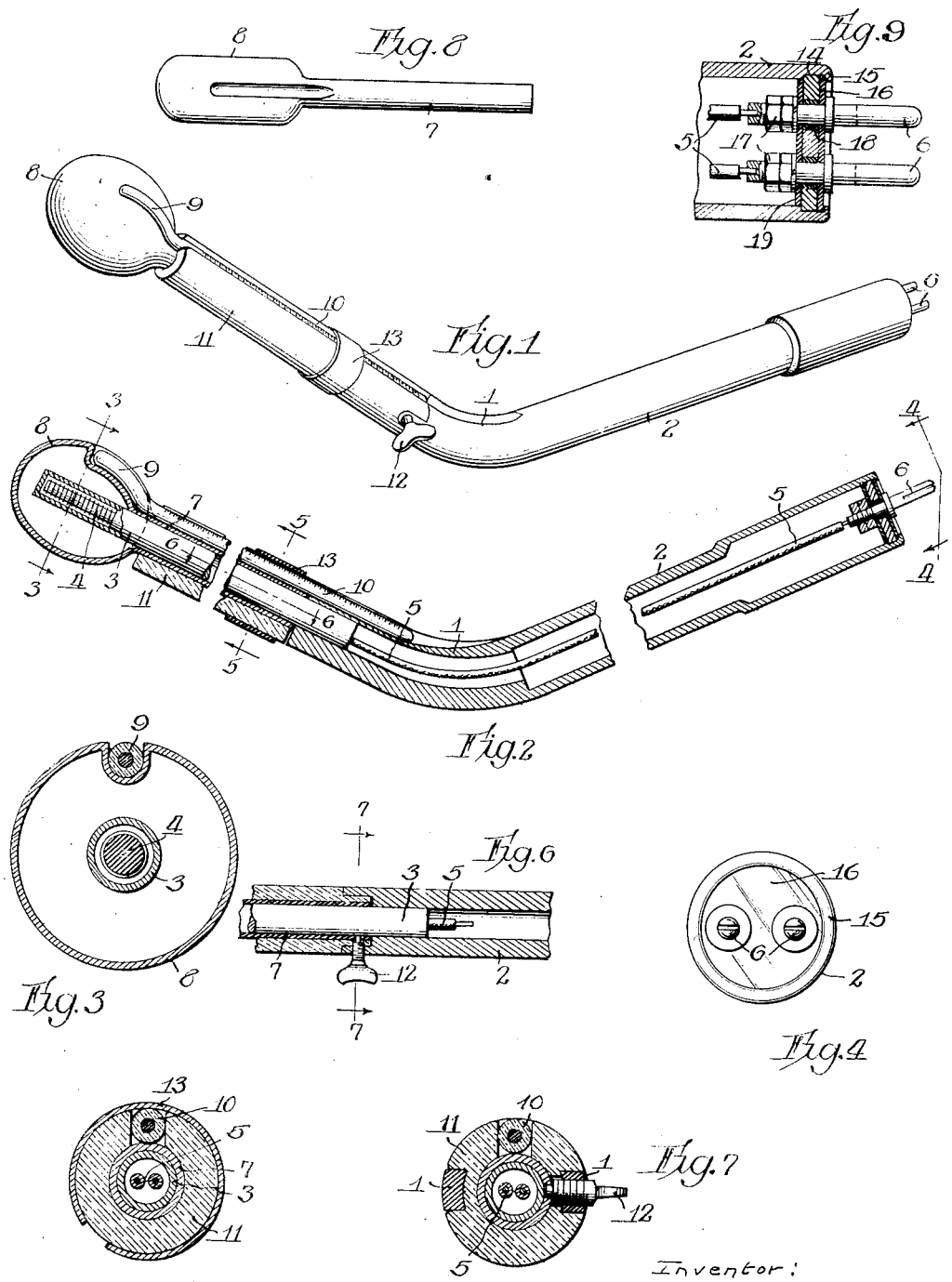

1,433,286

UNITED STATES PATENT OFFICE.

FABIAN M. KANNENSTINE, OF CHICAGO, ILLINOIS.

PHYSICIANS' HEATING APPLIANCE.

Application filed November 1, 1920. Serial No. 421,122.

*To all whom it may concern:*

Be it known that I, FABIAN M. KANNENSTINE, citizen of the United States, residing at Chicago, Illinois, have invented certain new and useful Improvements in Physicians' Heating Appliances; and I do hereby declare the following to be a full, clear, and exact description of the invention, such as will enable others skilled in the art to which it appertains to make and use the same.

My invention relates to electric heating appliances, and in certain of its general aspects aims to provide a heating appliance in which the thermal effect will be distributed with substantial uniformity over a heat applying surface of considerably greater area than the surface area of the heating element, and to provide simple means for ascertaining the temperature at the said larger surface. Furthermore, I aim to provide temperature-indicating means so disposed that the indication can be read at a distance from the heat-applying surface, to provide simple and effective means for thermally insulating the portion of the appilance leading to this heated surface, to provide for an interchange of parts having heat-applying portions of various sizes and shapes, to provide means whereby the same thermometer can be used interchangeably with the parts having these different shapes and sizes, and to provide simple and manually operable means for holding the parts in operable position and for permitting them to be detached when desired.

In another aspect, my invention relates to a portable heating appliance having a heating element mounted in one end of a tubular stem, and in this aspect I aim to provide interchangeable heat-transmitting members adapted to be sleeved upon the stem in operative relation to its heated end, to provide means for preventing the direct contact of other objects with the metal portions of the sleeve carrying the said heat-transmitting portion, to utilize air for transmitting the heat from the heated tip of the stem with substantial uniformity to the heat-applying portion, to provide a simple and effective detachable mounting for a thermometer in connection with such interchangeable heat-applying portions, to provide effective means for guarding the thermometer against accidental breakage, and to provide a novel mounting for the terminal wire connections of the appliance.

In one of its highly desirable applications, my invention relates to a heating appliance for physicians' use in applying heat to interior body portions, and aims to provide an appliance embodying the above named features and having its parts adapted to be sterilized and arranged for convenient manual separation to permit of such sterilization. Still further and more detailed objects will appear from the following specification and from the accompanying drawings, in which—

Fig. 1 is a perspective view of a physicians' heating appliance embodying my invention.

Fig. 2 is a central and longitudinal section through the same embodiment.

Figs. 3 and 5 are enlarged transverse sections taken respectively along the correspondingly numbered lines in Fig. 2.

Fig. 4 is an enlarged end view taken from the right hand end of Fig. 2.

Fig. 6 is a fragmentary and central section through intermediate portions of the appliance taken along the correspondingly numbered line in Fig. 2.

Fig. 7 is an enlarged transverse section taken along the correspondingly numbered line in Fig. 6.

Fig. 8 is a perspective view of another form of the applicator portion of the appliance, interchangeable with the oval bulbed form of Figs. 1 and 2.

Fig. 9 is an enlarged transverse section through the handle end of the main member of the illustrated appliance, showing the method of mounting and insulating the terminals.

In the drawings, my invention is shown in an embodiment suitable for applying heat to internal body portions, and for convenience in manipulating, the main member of the appliance has a bend 1 connecting the handle portion 2 with the tip 3 of this tubular member. Within the closed forward end of the stem 3 I mount an electric heating member 4 connected by wires 5 to contact tips 6 projecting rearwardly from the handle end of the appliance. The stem portion 3 which carries the heater in its tip is here shown as cylindrical, and has telescoped on it a metal sleeve 7 carrying a hollow bulb 8 which normally incloses the heating tip of the stem.

This bulb 8 is desirably of thin metal so as to transmit the heat readily and has a bore of such size as to freely surround the heating tip of the stem, so that the heat is transmitted to this bulb chiefly through the air within the latter and is therefore uniformly distributed through the bulb.

To ascertain the resulting temperature on the surface of the bulb, which is the surface applied to the body portion to be treated, I desirably groove one side of the bulb substantially as shown in Figs. 1 and 2 so as to house a correspondingly curved bulb 9 of a mercury thermometer. This thermometer has a straight and suitably graduated stem 10 extending along the sleeve 7 which carries the bulb, while the rest of the adjacent periphery of this sleeve is surrounded by an insulating sleeve 11 of a material which is a poor conductor of heat and which can readily be sterilized by the ordinary methods employed in connection with physicians' instruments, such as bakelite. This sleeve is normally locked in position with respect to the main member of my appliance by a thumb screw 12 which is threaded through a suitably shaped portion of the handle member 2 and which also interlocks with the rear end of the tube 7 as shown in Fig. 6, while the thermometer is held in its normal position by a collar 13 surrounding a portion of the said thermometer and an adjacent part of the insulating sleeve 11. This collar can be slid towards the bend in the appliance, and after removing the screw 12, the collar can be slid entirely beyond the stem of the thermometer, thereby permitting both the thermometer, the applicator member (comprising the tube 7 and the bulb 8) and the insulating sleeve 11 to be detached from the main member of the appliance, so that each part can be handled separately while sterilizing the same.

To provide a suitable water-tight closure for the rear end of the handle member while also insulating the wire terminals, I desirably construct this portion of my appliance as shown in Fig. 9. For this purpose, I first solder a thick disk 14 of metal into the tube 2 of the handle and slightly forward of the extreme rear end of the latter, thereby leaving a projecting end 15 of the tube which can afterwards be turned in over a disk 16 of mica disposed on the outside of this head 14. Both the metal disk 14 and the mica disk 16 have alined perforations, and similar perforations are provided in another mica disk 19 adjacent to the inner face of the metal disk, thus affording alined perforations for receiving the stems of the wire terminals 6 which I bolt to this head 14 by nuts 17, the stem of each terminal being laterally bushed by an insulating bushing 18.

At the other end of the main member, I desirably fill the space between the heating element 4 and the closed tip of the stem 3 by a cement of high heat conductivity such as alundum. To increase the range of usefulness of my appliance, I also desirably provide applicator members each having tubular stems 7 of the same size and shape, but having bulbs 8 of different sizes and shapes as desired for various purposes. By constructing these with tubular stem portions of equal size and by similarly grooving them for receiving the thermometer bulb, I allow these variously shaped applicator parts to be interchanged at the will of the user, thereby enabling my appliance to be used with equal facility for quite a variety of purposes. When used for treating interior body portions, the insulating sleeve 11 prevents any heated metal portion other than the bulb 8 from contacting with the body, while the scale of the thermometer can easily be read from outside the latter, thus enabling the physician to judge the treating temperature with great accuracy. Moreover, since this temperature is measured at the surface through which it is applied, no allowance need be made for variations in the conductivity of the part having this surface, as the measurement is that of the resulting temperature and not that of the heating element itself. I am therefore able to avoid both the uncertainties and the dangers heretofore encountered with guess work as to the actually attained temperatures, so that I can provide an appliance which will really be safe even in the hands of an inexperienced user.

So also, the readiness with which the constituent parts can be separated from one another permits each of the same to be sterilized easily and thoroughly, and my novel watertight mounting of the terminals (which is an important feature of my invention) seals the rear end of the handled portion of my appliance so that there is no danger of having liquid reach the heating element. Consequently, all risk of carrying infections can easily be avoided.

However, while I have illustrated and described my appliance in an embodiment particularly suited for physicians' use, I do not wish to be limited to this particular employment of the same. Neither do I wish to be limited to the particular details of construction and arrangement here disclosed, it being obvious that the same might be modified in many respects without departing either from the spirit of my invention or from the appended claims. Moreover, I have not gone into any particulars as to the proportioning of the heating element to the available voltage, or as to the methods of controlling and regulating the current so as to maintain the desired temperature, as both methods and contrivances for this purpose are well known to those familiar with electric heating appliances.

I claim as my invention:

1. In an electric heating appliance, a stem, a heating element in the tip of the stem, and a tube slidably housing the stem and having an enlarged and closed end normally inclosing the tip of the stem.

2. In an electric heating appliance, a stem, a heating element in the tip of the stem, a tube slidably housing the stem having an enlarged and closed end normally inclosing the tip of the stem, a handle at the other end of the stem, and a sleeve of heat-insulating material surrounding the portion of the stem between the handle and the said enlarged end.

3. In an electric heating appliance, a handle, a stem fast on the handle, a heating element mounted in the tip of the stem, and a plurality of applicator members interchangeably fitting the stem, each of the said members comprising a tube slidably fitting the stem and having an enlarged end portion adapted to house the said tip of the stem.

4. A heating appliance as per claim 3, in combination with a thermometer, and means carried by the stem for interchangeably securing the thermometer in position outside of any one of the applicator members.

5. In an electric heating appliance, a hollow applicator member, a heating element housed by the said member, a stem carrying the heating element and detachably supporting the applicator member, a thermometer having its bulb adjacent to the portion of the applicator which houses the heating element and having its stem adjacent to the first named stem, and heat insulating means carried by the first named stem and disposed for preventing both stems from contacting directly with the bore of any hollow object in which the heating-element-housing portion of the applicator member is inserted.

6. In appliance as per claim 5, in which both the thermometer and the heat insulating means are detachable from the first named stem, in combination with single means for securing both of the said detachable portions to the said stem.

7. In appliance as per claim 5, in which both the thermometer and the heat insulating means are detachable from the first named stem, in combination with a member slidable upon the insulating means and normally clamping the latter upon the said stem.

8. In appliance as per claim 5, in which both the thermometer and the heat insulating means are detachable from the first named stem, in combination with a member slidable upon the insulating means and normally clamping the latter upon the said stem and also holding the thermometer in operative position.

9. In an electric heating appliance, a heating element, a tubular casing inclosing the same, a disk disposed across the tubular casing at a distance from one end thereof and having a pair of perforations, insulating linings for both faces of the disk and for the said perforations, and a pair of terminals extending respectively through the said perforations, and electrically connected to the heating element, the portion of the tubular casing projecting beyond the said disk being flanged inwardly to clamp the outer insulating lining against the disk.

10. In an electric heating appliance, a heating element, a casing inclosing the same and having a tubular end, a disk disposed across the bore of the said end and having a perforation, a terminal extending through the said perforation and electrically connected to the heating element, and means for insulating the terminal from the disk.

Signed at Chicago, October 30th, 1920.

FABIAN M. KANNENSTINE.